(12) United States Patent
Cunningham, Jr.

(10) Patent No.: US 6,409,126 B1
(45) Date of Patent: Jun. 25, 2002

(54) PASSIVE FLOW CONTROL OF BLUFF BODY WAKE TURBULENCE

(75) Inventor: Atlee Marion Cunningham, Jr., Forth Worth, TX (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/703,877

(22) Filed: Nov. 1, 2000

(51) Int. Cl.$^7$ ................................................. B64C 23/06
(52) U.S. Cl. ........................................ 244/199; 244/130
(58) Field of Search ................................ 244/130, 199, 244/198, 200, 204, 210; 114/382

(56) References Cited

U.S. PATENT DOCUMENTS

| | | | |
|---|---|---|---|
| 5,133,516 A | * 7/1992 | Marentic et al. | 244/130 |
| 5,651,516 A | * 7/1997 | Mihora et al. | 244/204 |
| 6,186,445 B1 | * 2/2001 | Batcho | 244/130 |

OTHER PUBLICATIONS

*Fluid Dynamic Drag*, Chapter 3, pp. 4–7 Entitled "*Pressure Drag (Predominantly Experimental)*", written by Sighard. F. Hoerner, 1965.

*AIAA–85–0351* (*AIAA 23$^{rd}$ Aerospace Sciences Meeting*), "Passive Control Effects on Flow Separation Around a Protuberance at High Subsonic Speed", pp. 1–7, Written by F. L. Smith, D. C. Chou, and R. K. de Jonckheere, Jan. 14–17. 1985.

* cited by examiner

*Primary Examiner*—Peter M. Poon
*Assistant Examiner*—Timothy D Collins
(74) *Attorney, Agent, or Firm*—Jackson Walker LLP (57) ABSTRACT

The present invention provides an apparatus and system for controlling turbulence generated by medium passing about a bluff body disposed on a generally planar flow surface. An aft fairing, of a predetermined shape, is disposed on the flow surface in close proximity to the outbound section of the bluff body and a curved vortex fence, of a predetermined shape, is disposed on the flow surface near the front section of the bluff body with a predetermined gap between the vortex fence and the bluff body. In practice, the flow surface is propelled in a forward direction to develop medium flow from the front side of the bluff body to the outboard side of the bluff body. As the medium flows about the bluff body, the curved vortex fence re-directs the flow surface boundary layer in such a manner as to stabilize and strengthen the horse-shoe vortex by trapping it within the gap. The aft fairing stabilizes the downstream-directed legs of the horse-shoe vortex art of the bluff body.

18 Claims, 5 Drawing Sheets

PASSIVE FLOW CONTROL OF BLUFF BODY WAKE TURBULENCE

BACKGROUND OF THE INVENTION

1. Technical Field of the Invention

The present invention relates generally to the field of aeronautics, and, more particularly, to passive flow control of a medium about a bluff body disposed on a generally planar surface.

2. Description of Related Art

Even before World War II flow control devices were being created to help control turbulence created by the flow of air over an airfoil such as a wing of an aircraft. An aircraft attains lift by forcing air over a shaped wing at a higher rate of speed than the air passing below the wing. Since the air above the wing travels at a higher rate than the air below, an area of high pressure is developed below the wing and an area of low pressure is created above the wing resulting in an upwardly directed lifting force. As the two air flows merge back together aft of the wing, turbulence and/or unstable vortices form at higher incidences to the direction of travel which can extend for long distances behind the moving wing. Other devices of varying spherical shapes mounted to or protruding from the wing or fuselage cause similar turbulence as the airflow moves across and around the protruding devices and separates to form a turbulent wake. This turbulence reduces the aerodynamic performance, by reducing lift and control as well as increasing drag of an aircraft.

The structure of a turbulent boundary layer has been studied by numerous investigators and its description in terms of rational structures is subject to much debate. Though turbulence is a very complex phenomenon, a specific set of features in the turbulent boundary layer has been identified: streamwise vortices, wall layer streaks, ejections, breakups, sweeps, outer layer motions and their interactions with the wall and entrainment of irrotational flows. The creation of turbulence has usually been referred to as the bursting phenomenon. One approach to interpreting turbulence control experiments is to view them as attempts to interfere with some component of the turbulence creation cycle. Thus, one can think of modifying either the large outer vortices or the wall layer elements, thus, changing the communication between the various scales.

Many advantages are realized by improving the aerodynamic performance of an aircraft. For example, a reduction in drag will reduce the fuel necessary to power the aircraft. Since, millions of dollars are spent each year on fuel to power commercial and military aircraft, thus, even small decreases in fuel consumption results in large fuel cost savings. Current drag control devices which have been developed include laminar flow control using suction, blowing, polymer additive compliant walls, textured surfaces, and riblet structures. Practical application of these devices generally spawn complex parts, high cost, added weight, maintainability problems and have not been extended to control turbulence about a round or spherical type body positioned on an aerodynamic surface.

The above-mentioned and other disadvantages of the prior art are overcome by the present invention, by providing a fully passive device to control turbulence requiring only low profile wall modifications.

SUMMARY OF THE INVENTION

The present invention achieves technical advantages as an apparatus and system for controlling turbulence generated by medium passing about a bluff body disposed on a generally planar flow surface. The system uses a forward curved vortex fence and an aft fairing all of which have a predefined width of less than that of the bluff body. The maximum height of the forward curved vortex fence and aft fairing is a fraction of the bluff body. The forward curved vortex fence is disposed on the flow surface in front of the bluff body extending forward. The curved vortex fence is positioned most near the forward face of the bluff body, but, allowing a predetermined gap between the two. The gap is a fraction of the bluff body height. The aft fairing is disposed on the flow surface in back of the bluff body with the leading edge positioned most near the aft face of the bluff body with a minimum practical gap or no gap at all. The length of the aft fairing has a leading edge and trailing edge in which the height tapers continuously from a maximum at the leading edge to a minimum at the trailing edge.

In another embodiment of the present invention, the system and method for controlling turbulence generated by medium passing about a bluff body disposed on a generally planar flow surface includes a forward fairing integrated with the forward curved vortex fence and the above-described aft fairing. The forward fairing also has a predefined width and height of less than that of the bluff body. The length of the forward fairing has a leading edge and a trailing edge in which the height tapers continuously from a minimum at the leading edge to a maximum equal to the curved vortex fence height at the trailing edge. The forward fairing is disposed on the flow surface in front of the bluff body with the trailing edge integrated with the forward curved vortex fence and positioned most near the bluff body, but, allowing a predetermined gap between the two.

In practice, the flow surface is propelled in a forward direction to develop medium flow from the front side of the bluff body around the outboard sides of the bluff body and into a wake behind the bluff body. Without the curved vortex fence and aft fairing with or without the and/or forward fairing, the wake is normally very turbulent and is a low-energy flow, both of which are caused by the blockage effect of the bluff body. The curved vortex fence and aft fairing with or without the forward fairing work together to modify and organize occurring flow features in such a manner as to provide a pumping effect that redirects flow of high energy non-turbulent medium from around the outboard sides of the bluff body into the low energy turbulent wake behind the bluff body.

The occurring flow features that are modified and organized by the present invention include, but are not limited to, (1) the boundary layer flow that exists on the flow surface upstream of the bluff body, and (2) an unstable "horse-shoe" vortex that exists along the corner of the intersection of the bluff body and the flow surface. The modified and organized flow features provide reduced drag, reduced energy required to propel the flow surface and/or improved control of the flow surface.

Among the new advantages of the present invention are: no moving components are required, reducing the cost and complexity of non-passive devices; only low profile wall modifications are required to practice the invention, thus, parasitic drag is reduced or eliminated; and drag is reduced, consequently, energy required to propel the flow surface is reduced and control of the flow surface is improved.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses of innovative teachings herein. In general statements made in this specification of the present application do not necessarily delimit any of the various claimed inventions. Moreover, some statements may apply to some inventive features but not to others.

Figure 1:
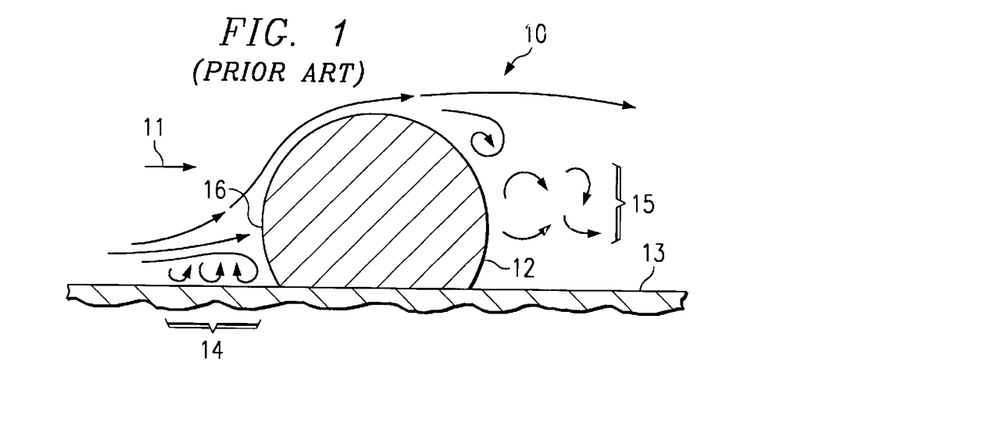
FIG. 1 (Prior Art) illustrates a side view of a planar surface with a visualized medium flow about a bluff body disposed thereon.

Referring now to the drawings and more particularly to FIG. 1, there is illustrated a side view 10 of a visualized medium flow over a generally planar surface or flow surface 13 in which a curved or spherical shaped body, known as a bluff body 12, is positioned or attached. The direction of the medium flow is indicated by arrow 11. For aeronautical applications the flow surface 13 can be an airfoil, a portion of a fuselage or an internal component of the propulsion system. The present invention can also be used, for example, as a boundary layer device in oil and gas pipelines for reducing drag during transport.

Figure 2:
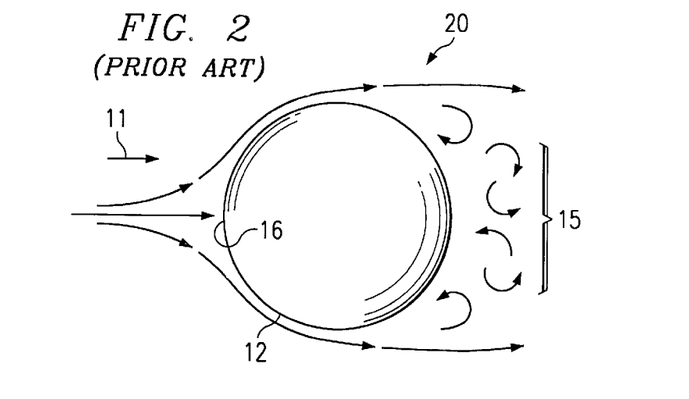
FIG. 2 (Prior Art) illustrates the top view of a planar surface with a visualized medium flow about a bluff body disposed thereon.

As the medium flows over the flow surface 13 and around the bluff body 12, the medium tends to separate as it moves from the front side of the bluff body 12 to the outboard side. Below a stagnation point 16 located on the front side of the bluff body 12, the medium is swept toward the flow surface 13 creating unstable horse-shoe type wall vortices 14. Above the stagnation point 16, a portion of the medium is generally ejected over the bluff body 12 as the flow passes about the outboard side at about the maximum body width or height 12, flow separates from the body. This creates wake turbulence 15, which is located in an area on the outboard side of the bluff body 12, can continue for a great distance. The wake turbulence 15 includes many unstable and/or random chaotic vortices, consequently, medium flow direction and velocity can vary greatly within the wake turbulence 15. The wake acts like a shield that prevents incursion of high-speed or high energy flow and blocks attempts to energize the lethargic wake region 15. FIG. 2 illustrates a top view of the visualized medium flow 20 about the bluff body 12 of FIG. 1.

Figure 3A:
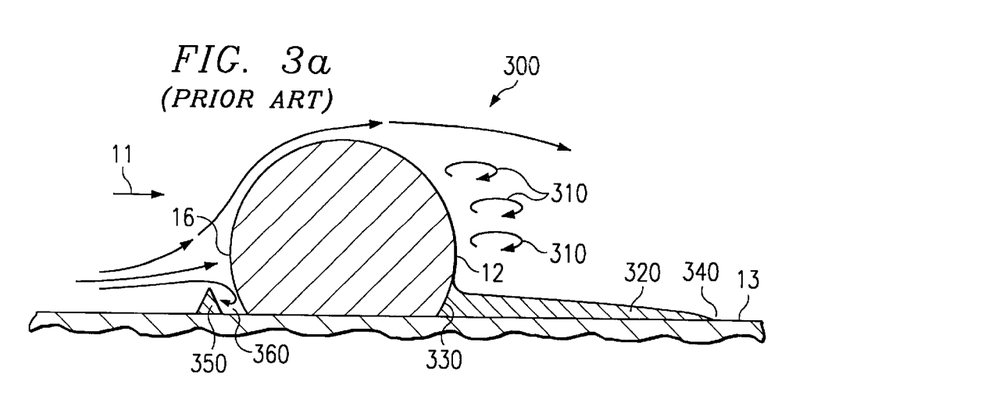
FIG. 3a illustrates a cross-sectional view of an aft fairing and vortex fence with a visualized medium flow about a bluff body disposed on a planar surface in accordance with an embodiment of the present invention.

Now referring to FIG. 3a, there is illustrated a cross-sectional view of an aft fairing 320 and forward curved vortex fence 350 with a visualized medium flow 300 about the bluff body 12 disposed on a planar surface 13 in accordance with a preferred embodiment of the present invention. To continue a drag reducing effect over a useful distance, the wake must have a structure allowing it to survive far downstream. The unstable horse-vortex is approximately symmetric about a line parallel to the flow surface motion that passes through the center of the bluff body 12 and is generally semi-circular forward of the bluff body 12 with two unstable straight legs that extend downstream in the flow direction at each side of the maximum width of the bluff body. The forward curved vortex fence 350 re-directs the flow surface boundary layer in such a manner as to stabilize and strengthen the horse-shoe vortex 360 by trapping it within a gap formed between the curve vortex fence 350 and the forward face of the bluff body 12. The role of the aft fairing 320 is to establish stabilized downstream-directed legs of the horse-shoe vortex aft of the bluff body 12. The stabilized legs provide a pumping action which pulls high energy non-turbulent flow into the low energy turbulent wake of the bluff body 12.

The forward curved vortex fence 350 and aft fairing 320 can be a separate structure from the flow surface 13 or it can be an area of the flow surface 13 which is built up, using similar or other materials. When the separate structure embodiment is practiced, the forward curved vortex fence 350 and aft fairing 320 can be attached or affixed to the underlying flow surface 13 using, for example, cement, rivets or other attachment type devices known in the art. The bottom surface of the forward curved vortex fence 350 and aft fairing 320 which is disposed directly on the flow surface 13 is contoured to match the generally planar shape of the flow surface 13. In a preferred embodiment, the aft fairing 320 is of the length of approximately 1.25 to 1.5 times the width of the bluff body 12. The aft fairing 320 also has a leading edge 330 and a trailing edge 340. The height of the aft fairing 320 tapers from a maximum at the leading edge 330 to a minimum at the trailing edge 340. The maximum height of the curved vortex fence 350 and aft fairing 320 is only a fraction of the height of the bluff body 12, with a preferred height of approximately $\frac{1}{4}$th to $\frac{1}{3}^{rd}$ to that of the bluff body 12.

Figure 3B:
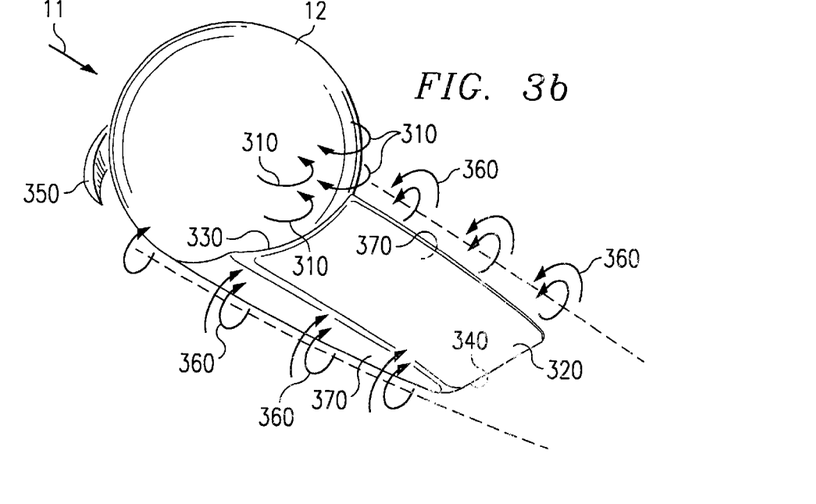
FIG. 3b illustrates a perspective view of an aft fairing and vortex fence with a visualized medium flow about a bluff body disposed on a planar surface in accordance with an embodiment of the present invention.

Now referring to FIG. 3b, there is illustrated a perspective view of the aft fairing 320 of the present invention. The leading edge 330 of the aft fairing 320 is contoured to substantially match the curved surface of the lower portion of the bluff body 12 such that application to the flow surface 13 provides no gaps or only small gaps between the aft fairing 320 and the bluff body 12. Small gaps can further be eliminated or reduced by applying a type of filling material into the gap area, for example. The maximum width of the aft fairing 320 is approximately equal to the width of the bluff body 12. The width preferably tapers slightly from a maximum at the leading edge 330 to a minimum at the trailing edge 340. In addition to the height tapering from the leading edge to the trailing edge in the direction of the medium flow, the height of the fairing tapers from one adjacent edge 370 to another, perpendicular to the medium flow. On a perpendicular axis, the height is at a maximum at the most middle point between the adjacent edges 370 and, from the middle point, the height tapers to a minimum at each adjacent edge 370.

Figure 4:
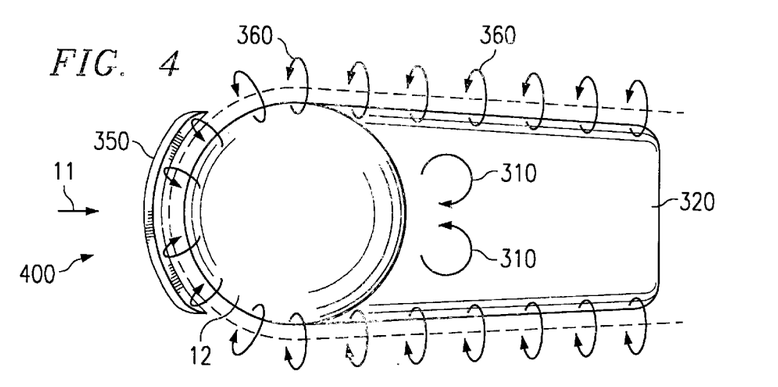
FIG. 4 illustrates a top view of an aft fairing and vortex fence with a visualized medium flow about a bluff body disposed on a planar surface in accordance with an embodiment of the present invention.

Referring now to FIG. 4 there is illustrated a top view of the forward curved vortex fence 350 and aft fairing 320. The curved vortex fence 350 is positioned most near the forward face of the bluff body 12, but, allowing a predetermined gap between the two. The curve of the curved vortex fence 350 is defined as being slightly larger than the radius of the bluff body 12.

Figure 5:
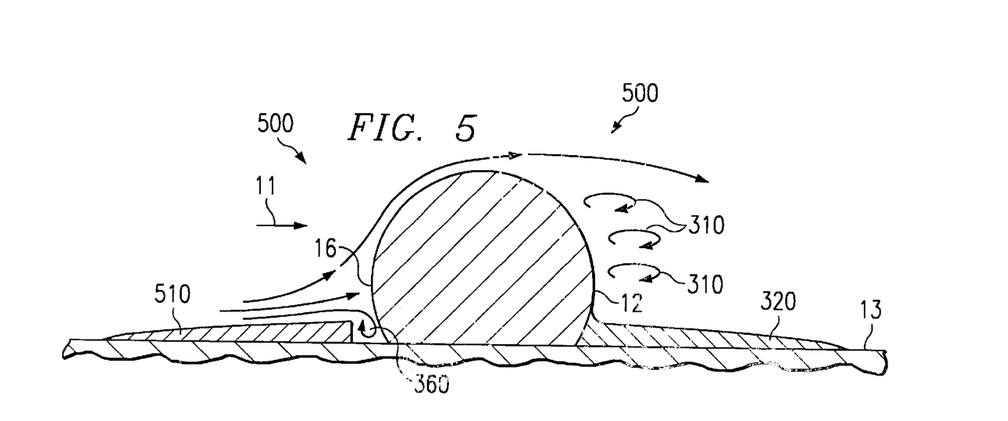
FIG. 5 illustrates a cross-sectional view of a forward fairing and aft fairing with a visualized medium flow about a bluff body disposed on a planar surface in accordance with an embodiment of the present invention.

Referring now to FIG. 5 there is illustrated another embodiment 500 of the present invention. As illustrated, the aft fairing 320 can be complemented with a forward fairing 510. The forward fairing 510 is integrated with the curved vortex fence 350 to form one piece. The forward fairing 510 can be a separate structure from the flow surface 13 or it can be an area of the flow surface 13 which is built up, using similar or other materials, into the geometry of the forward fairing 510 of the present invention. When the separate structure embodiment is practiced, the forward fairing 510 can be attached or fixed to the underlying flow surface 13 using, for example, cement, rivets, or other attachment type devices known in the art. The bottom surface of the forward fairing 510 which is disposed directly on the flow surface 13 is contoured to match the generally planar shape of the flow surface 13. The forward fairing 510 is of a length of approximately equal to the width of the bluff body 12. The forward fairing 510 also has a leading edge and a trailing edge with the trailing edge disposed most near the bluff body 12. The height of the forward fairing 510 tapers from a minimum at the leading edge to a maximum equal to the integrated curved vortex fence height at the trailing edge. In a preferred embodiment, the maximum height is approximately $\frac{1}{4}^{th}$ to $\frac{1}{3}^{rd}$ of that of the bluff body 12. The forward fairing 510 further stabilizes and strengthens the horse-shoe vortex 360 trapped within the gap formed between the integrated curved vortex fence 350 and the forward face of the bluff body 12.

Figure 6:
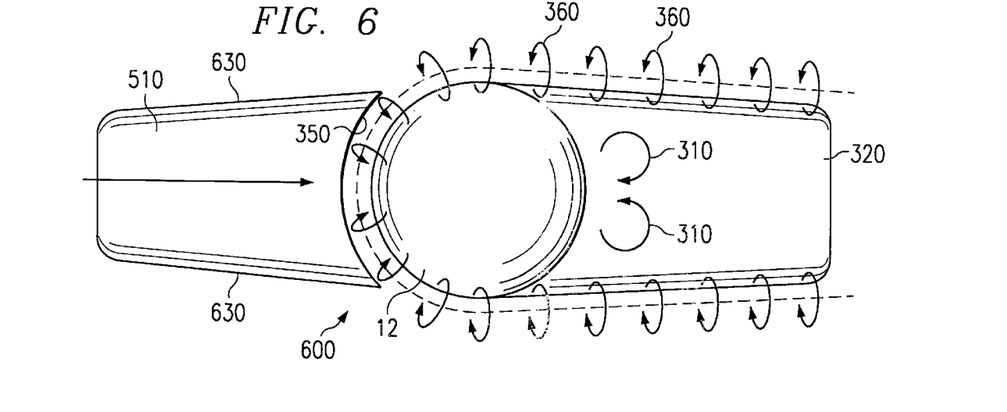
FIG. 6 illustrates a top view of a forward fairing and aft fairing with a visualized medium flow about a bluff body disposed on a planar surface in accordance with an embodiment of the present invention.

Referring now to FIG. 6 there is illustrated a top view of the forward fairing 510 and aft fairing 320 with a visualized medium flow about the bluff body 12 in accordance with the present invention. The trailing edge of the forward fairing 510 is contoured to substantially match the curved surface of the lower front portion of the bluff body 12. The forward fairing 510 is disposed on the flow surface 13 at a distance from the forward side of the bluff body 12 such that a predetermined gap width or stabilizing gap is created. In a preferred embodiment, the width of the gap is approximately uniform across the trailing edge of the forward fairing 510. As the bluff body 12 is moved in a forward direction to develop a medium flow having a direction indicated by arrow 11, the medium flow below the stagnation point 16 is swept towards the stabilizing gap. Thus, the unstable horseshoe wall vortices, which generally form below the stagnation point, are trapped in the stabilizing gap and are stabilized into uniform horse-shoe type vortices. The maximum width of the forward fairing 510 is approximately equal to the width of the bluff body 12. The width preferably tapers slightly from a maximum at the trailing edge to a minimum at the leading edge 330.

In addition to the height of the forward fairing 510 tapering from the trailing edge to the leading edge (as seen in FIG. 5), in the direction of the medium flow, the height of the fairing can taper from one adjacent edge to a second adjacent edge, perpendicular to the medium flow. On a perpendicular axis, the height is at a maximum at the most middle point between the adjacent edges and, from the middle point, the height tapers to a minimum at each adjacent edge.

Experiments show that wake turbulence before application of the aft fairing 320 and front fairing 510 with integrated curved vortex fence 350 had air RMS (Root Mean Square) pressure of approximately 0.830 PSF (Pounds per Square Foot) on a center line at a distance 1.9 times the diameter of the bluff body 12 down stream of the bluff body 12 and approximately 2.742 PSF at 0.43 bluff body diameter off the center line. After application, experiments show a reduction in wake turbulence to 0.210 on the center line and 0.798 at 0.43 off the center line. Stated in other terms, before application, 0.046 CP on center line and 0.152 CP at 0.43 off center line where CP is equal to $(PSF)_{RMS}/q$. $(PSF)_{RMS}$ is equal to the RMS of the wake turbulence pressure fluctuation and q is equal to the free stream dynamic pressure. In the experiments, q was set to 18 PSF. After application of the aft fairing 320 and forward fairing 510 with integrated curved vortex fence 350, CP was improved to 0.0117 on center line and 0.0443 at 0.43 off center line.

Figure 7:
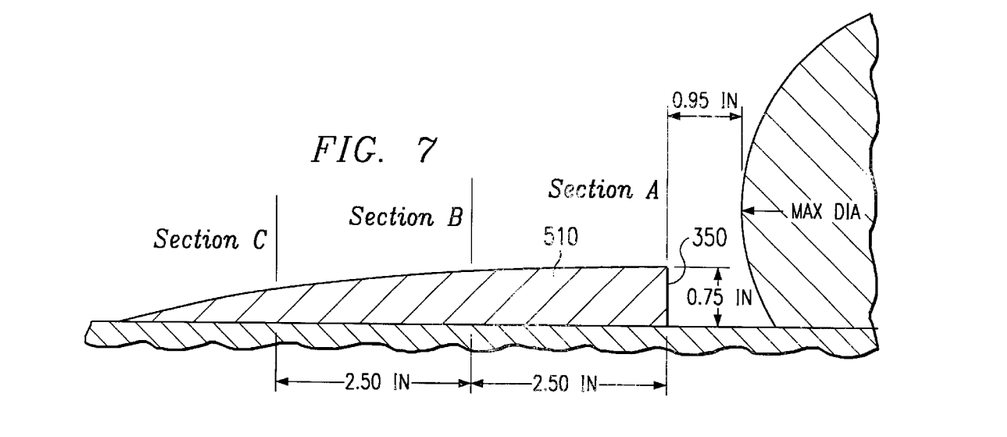
FIG. 7 illustrates a cross section view of a forward fairing in accordance with an embodiment of the present invention.
Figure 8:
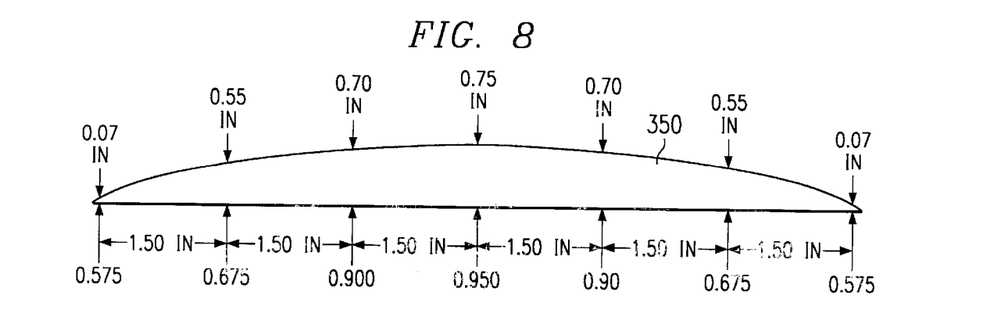
FIG. 8 illustrates a front view of an unrolled vortex fence in accordance with an embodiment of the present invention.
Figure 9:
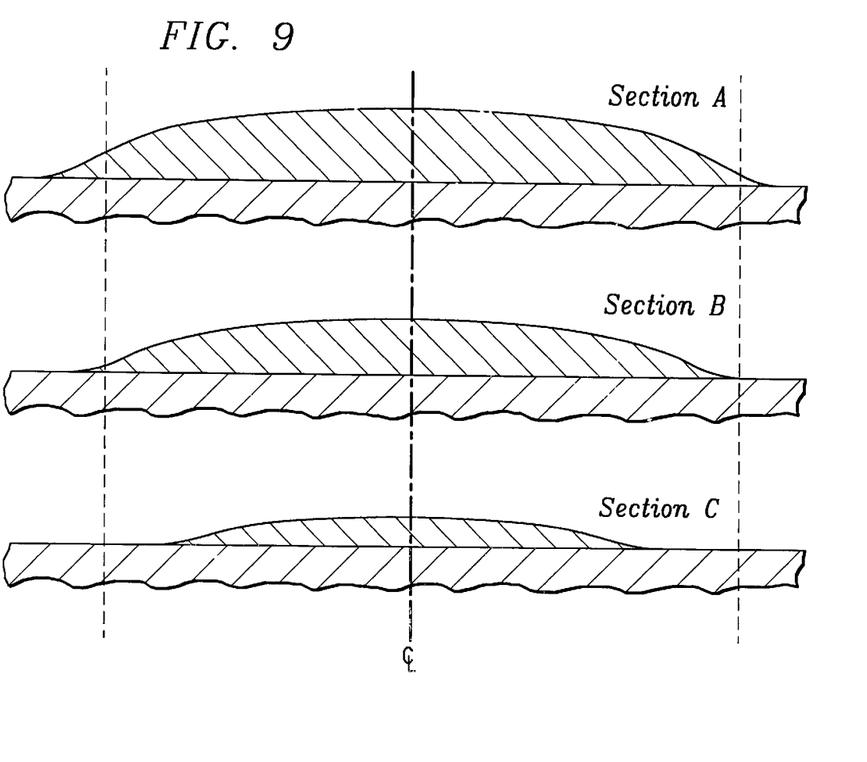
FIG. 9 illustrates a cross section of each marked section of the forward fairing illustrated in FIG. 9.

Referring now to FIG. 7 there is illustrated a side cross sectional view of a preferred embodiment of the front fairing 510 with integrated curved vortex fence 350 for a bluff body diameter of 7 inches. FIG. 8 illustrates a preferred embodiment of the flattened curved vortex fence 350 as it appears from the perspective of the forward portion of the bluff body. FIG. 9 illustrates the side cross sectional view of the forward fairing at each section mark shown in FIG. 7.

Figure 10:
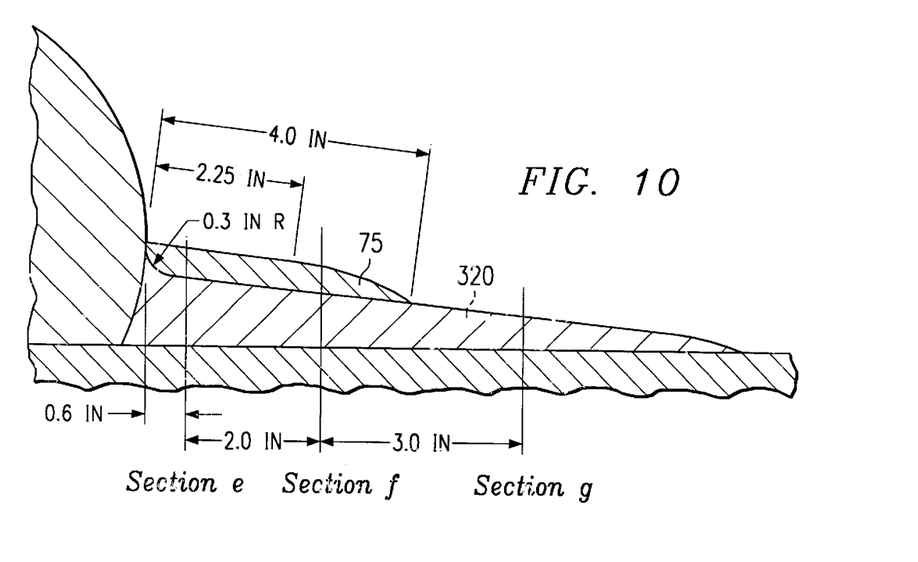
FIG. 10 illustrates a cross section side view of an aft fairing in accordance with an embodiment of the present invention.
Figure 11:
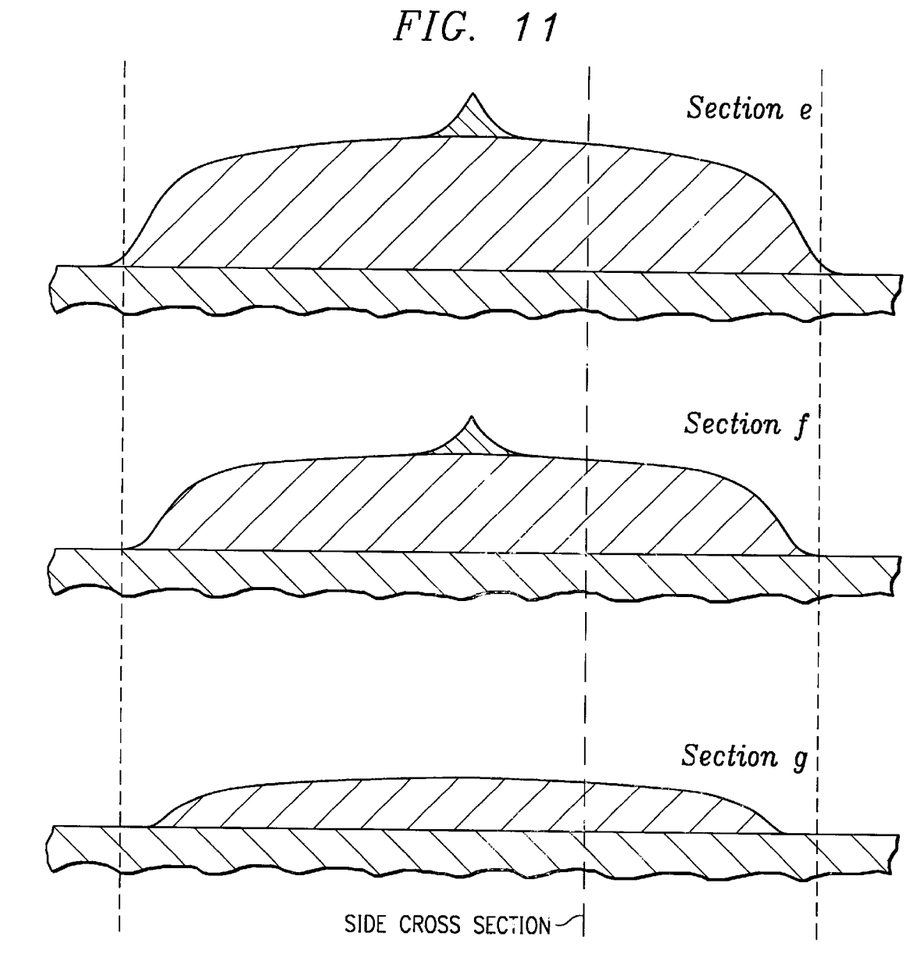
FIG. 11 illustrates a cross section view of each marked section of the aft fairing illustrated in FIG. 10.

Referring now to FIG. 10 there is illustrated a cross section of another embodiment of the aft fairing 320 in accordance with the present invention. The aft fairing 320 of this embodiment includes an optional fin peak 75 located on the top middle most portion of the aft fairing 320 beginning at the leading edge and extending toward the trailing edge. The total preferred length of the fin peak 75 is approximately ½ the bluff body width. FIG. 11 illustrates a side cross section view of the aft fairing 320 including the fin peak 75 at each section mark of FIG. 10.

Although a preferred embodiment of the apparatus and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. On a generally planar flow surface having a body disposed thereon, an apparatus for controlling turbulence generated by a medium passing about said body, wherein said medium passes from a front of said body to an outboard side of said body, the apparatus comprising;

a vortex fence disposed on said flow surface in front of said body, said vortex fence positioned enabling a predetermined gap width between said vortex fence and body;

an aft fairing disposed on said flow surface on said outboard side of said body with a leading edge portion positioned in close proximity to an aft face of said body; and a forward fairing comprising:

a lower surface portion having a width substantially equal to a width of said body;

a trailing edge portion having a surface contour substantially equal to a surface contour of a forward side of said body said vortex fence integrated into said trailing edge portion of said forward fairing, wherein said forward fairing is positioned enabling said predetermined gap width; and an upper surface portion having a tilt with a maximum height from said flow surface at said trailing edge portion and extending forwardly to a minimum height at a leading edge portion of said forward fairing.

2. The apparatus of claim 1, wherein said aft fairing further comprising:

a lower surface portion having a width substantially equal to a width of said body;

said leading edge portion having a surface contour substantially equal to a surface contour of said aft face of said body; and an upper surface portion having a tilt with a maximum height from said flow surface at said leading edge portion and extending rearwardly to a minimum height at a trailing edge portion of said aft fairing.

3. The apparatus of claim 2, wherein said aft fairing upper surface portion further having a pair of adjacent edges and a middle point, wherein a height tapers continuously across said upper surface portion from a maximum at said middle point to a minimum at said adjacent edges.

4. The apparatus of claim 2, wherein said width further having a continuous taper from a maximum at said leading edge portion to a minimum at said trailing edge portion.

5. The apparatus of claim 1, wherein said body is a bluff body.

6. The apparatus of claim 1, wherein said forward fairing upper surface portion further having a pair of adjacent edges and a middle point, wherein a height tapers across said upper surface portion from a maximum at said middle point to a minimum at said adjacent edges.

7. The apparatus of claim 1, wherein said forward fairing lower surface portion width further having a continuous taper from a maximum at said forward fairing trailing edge portion to a minimum at said forward fairing leading edge portion.

8. A system for controlling wake turbulence generated by a medium passing about a body disposed on a generally planar flow surface, comprising:

a vortex fence disposed on said flow surface on a forward side of said body, said-vortex fence positioned enabling a predetermined gap width between said vortex fence and said body, said vortex fence having a contour substantially equal to a contour of said forward side of said body;

an aft fairing disposed on said flow surface on an outboard side of said body with a leading edge portion positioned in close proximity to aft face of said body; and a forward fairing comprising:

a lower surface portion having a width substantially equal to a width of said body;

a trailing edge portion having a surface contour substantially equal to a surface contour of a forward side of said body, said vortex fence integrated into said trailing edge portion of said forward fairing, wherein said forward fairing is positioned enabling said predetermined gap width; and an upper surface portion having a tilt with a maximum height from said flow surface at said trailing edge portion and extending forwardly to a minimum height at a leading edge portion of said forward fairing.

9. The system of claim 8, wherein said aft fairing further comprises:

a lower surface portion having a width substantially equal to a width of said body;

said leading edge portion having a surface contour substantially equal to a surface contour of said aft face of said body; and an upper surface portion having a tilt with a maximum height from said flow surface at said leading edge portion and extending rearwardly to a minimum height at a trailing edge portion of said aft fairing.

10. The system of claim 9, wherein said aft fairing upper surface portion further having a pair of adjacent edges and a middle point, wherein a height tapers continuously across said upper surface portion from a maximum at said middle point to a minimum aft said adjacent edges.

11. The system of claim 9, wherein said lower surface portion width further having a continuous taper from a maximum at said leading edge portion to a minimum at said trailing edge portion.

12. The system of claim 8, wherein said body is a bluff body.

13. The system of claim 8, wherein said forward fairing upper surface portion further having a pair of adjacent edges and a middle point wherein a height tapers across said upper surface portion from a maximum at said middle point to a minimum at said adjacent edges.

14. The system of claim 8, wherein said forward fairing lower surface portion width further having a continuous taper from a maximum at said forward fairing trailing edge portion to minimum at said forward fairing leading edge portion.

15. The system of claim 8, wherein said maximum height of said forward and aft fairings are approximately ¼th to ⅓rd of a height of said body.

16. An apparatus adapted to be disposed about a body which is attached to a generally planar flow surface over which there is a medium flow along a direction from a forward side of said body to the outboard side of said body where the medium flow tends to become separated into wake turbulence, said apparatus being located to organize said wake turbulence into stable vortices and further to deflect said stabilized vortices toward said flow surface comprising:

an aft fairing comprising:

a lower surface portion adapted to be disposed on said flow surface, said lower surface portion further having a width substantially equal to a width of said body;

a leading edge portion adapted to be disposed adjacent to said outboard side of said body, said leading edge portion further having a contour substantially equal to a contour of said outboard side of said body; and an upper surface portion having a generally planar configuration and having a substantially parallel alignment with said flow surface, said upper surface portion further having a continuous taper with a maximum height perpendicular from said flow surface at said leading edge portion and extending rearwardly to a minimum height at a trailing edge portion; and a vortex fence disposed on said flow surface on said forward side of said body, said vortex fence positioned enabling a predetermined gap width between said vortex fence and said body, said vortex fence having a contour substantially equal to a contour of said forward side of said body.

17. The apparatus of claim 16 further comprising:

a forward fairing comprising:
- a lower surface portion adapted to be disposed on said flow surface, said lower surface portion further having a width substantially equal to a width of said body;
- a trailing edge portion adapted to be disposed adjacent to a forward side of said body, said vortex fence integrated into said forward fairing training edge portion, wherein said forward fairing is positioned enabling said predetermined gap; and
- an upper surface portion having a generally planar configuration having a substantially parallel alignment with said flow surface, said forward upper surface portion further having a continuous taper with a maximum height perpendicular from said flow surface at said trailing edge portion and extending forwardly to a minimum height at a leading edge portion.

18. A system for controlling wake turbulence generated by a medium passing about a body disposed on a generally planar flow surface, comprising:
- a vortex fence disposed on said flow surface on a forward side of said body, said vortex fence positioned enabling a predetermined gap width between said vortex fence and said body, wherein said predetermined gap width is approximately ¼th to ⅓rd of a height of said body, said vortex fence having a contour substantially equal to a contour of said forward side of said body; and
- an aft fairing disposed on said flow surface on an outboard side of said body with a leading edge portion positioned in close proximity to aft face of said body.

* * * * *